United States Patent
Whaley et al.

(10) Patent No.: US 9,614,671 B2
(45) Date of Patent: Apr. 4, 2017

(54) USER ACCESS CONTROL BASED ON A GRAPHICAL SIGNATURE

(75) Inventors: Andrew Whaley, Buxton (GB); George French, Bedford (GB); Jeremy Goldstone, Prestwich (GB); Ian Sayers, Cheshire (GB)

(73) Assignee: BARCLAYS BANK PLC, London (GB)

( * ) Notice: Subject to any disclaimer, the term of this patent is extended or adjusted under 35 U.S.C. 154(b) by 0 days.

(21) Appl. No.: 14/362,266

(22) PCT Filed: Dec. 2, 2011

(86) PCT No.: PCT/GB2011/052390
§ 371 (c)(1),
(2), (4) Date: Sep. 4, 2014

(87) PCT Pub. No.: WO2013/079893
PCT Pub. Date: Jun. 6, 2013

(65) Prior Publication Data
US 2014/0369497 A1 Dec. 18, 2014

(51) Int. Cl.
*H04L 9/08* (2006.01)

(52) U.S. Cl.
CPC .......... *H04L 9/0861* (2013.01); *H04L 9/0866* (2013.01)

(58) Field of Classification Search
CPC ....... H04L 9/0861; H04L 9/0866; H04L 9/08; H04L 9/30; H04L 9/22; H04L 9/18; H04L 9/06
USPC .......................................................... 380/44
See application file for complete search history.

(56) References Cited

U.S. PATENT DOCUMENTS

| 5,596,656 | A | * | 1/1997 | Goldberg | G06F 3/04883 345/179 |
| 6,373,473 | B1 | * | 4/2002 | Sakaguchi | G06F 17/30259 345/173 |
| 7,219,368 | B2 | * | 5/2007 | Juels | G06F 21/36 726/17 |
| 8,327,422 | B1 | * | 12/2012 | Friedman | G06F 21/44 713/168 |
| 8,931,060 | B2 | * | 1/2015 | Bidare | G06F 21/36 2/18 |
| 2002/0029341 | A1 | * | 3/2002 | Juels | G06F 21/36 713/184 |
| 2003/0215112 | A1 | * | 11/2003 | Rhoads | B42D 25/29 382/100 |
| 2004/0049685 | A1 | * | 3/2004 | Jaloveczki | G06F 21/36 713/182 |
| 2009/0217035 | A1 | * | 8/2009 | Abdul Hameed Khan | G06F 21/31 713/168 |
| 2011/0154025 | A1 | * | 6/2011 | Spalka | H04L 9/3073 713/156 |
| 2012/0102551 | A1 | * | 4/2012 | Bidare | G06F 21/36 726/4 |
| 2014/0075549 | A1 | * | 3/2014 | Lewis | G06F 21/31 726/19 |
| 2014/0369497 | A1 | * | 12/2014 | Whaley | H04L 9/0861 380/44 |
| 2015/0143509 | A1 | * | 5/2015 | Selander | G06F 21/46 726/18 |

* cited by examiner

FOREIGN PATENT DOCUMENTS

WO    WO 01/77792    10/2001

OTHER PUBLICATIONS

Dirk Scheuermann et al: "On biometric key generation from handwritten signatures" BIOSIG 11 proceedings of the Special Interest Group on Biometrics and electronic Signature, Sep. 8, 2011 pp. 103-114.*
MD. Itrat Bin Shams "Signature Recognition by Segmentation and Regular Line Detection" Oct. 30-Nov. 2, 2007; TENCON 2007—2007 IEEE Region 10 Conference.*
"Information technology—Biometric data interchange formats—Part 7: Signature/sign time series data," International Standard ISO/IEC 19794-7, 2007.
Scheuermann et al., "On biometric key generation from handwritten signatures," Special Interest Group on Biometrics and Electronic Signatures (BIOSIG Annual Conference), 2011.

*Primary Examiner* — Farid Homayounmehr
*Assistant Examiner* — Sanchit Sarker
(74) *Attorney, Agent, or Firm* — Cowan, Liebowitz & Latman, P.C.; Steven D. Underwood

(57) ABSTRACT

A user inputs a pattern consisting of a plurality of lines. The lines are classified by relative length, overall direction and degree of curvature. Where a line is started from a new position, the direction from the previous starting point is taken into account. The series of lines is then serialized into a key value, which may then be used to decrypt data stored on a device. This enables data to be securely stored since the key is supplied by the user at runtime and is not itself stored on the device.

11 Claims, 5 Drawing Sheets

USER ACCESS CONTROL BASED ON A GRAPHICAL SIGNATURE

FIELD OF THE INVENTION

This invention relates to user access control, particularly but not exclusively involving access to locally stored data.

BACKGROUND OF THE INVENTION

Some client applications, such as mobile applications, use a 4-6 digit PIN to protect against unauthorised access. This in itself is a weak form of authentication, with a 5 digit PIN providing only 100,000 combinations; the correct PIN could be guessed easily by a 'brute force' attack i.e. trying every combination.

To counter this, most mobile applications store no sensitive data locally on the mobile client, and implement a lock-out scheme which is enforced on the server after a few wrong attempts at entering the PIN. However, it would advantageous for a mobile application to store data at the mobile client for access and analysis when disconnected. There is therefore a need for secure access to locally stored data that can survive brute force attacks.

SUMMARY OF THE INVENTION

According to one aspect of the present invention, there is provided a method according to claim 1. According to another aspect of the present invention, there is provided a method according to claim 4.

In an embodiment of the present invention, a user inputs on a device a graphical pattern consisting of a plurality of lines. The lines are classified by relative length, overall direction and degree of curvature. Where a line is started from a new position, the direction from the previous starting point is taken into account. The series of lines is then serialised into a key value, which may then be used to encrypt and/or decrypt data stored on a device. This enables data to be securely stored since the key is supplied by the user at runtime and is not itself stored on the device.

The pattern may consist of a plurality of lines or strokes. Each line may be straight or curved, and may continue from the end of the previous line, the new line being identified by a significant change in direction, or may start from a new position. The pattern may resemble a signature or gesture of a type that would be familiar to many users.

The lines of the input pattern are then classified by relative length, overall direction and degree of curvature. Where a line is started from a new position, the direction from the previous starting point is taken into account. The series of lines is then serialised into a key value.

The key value may then be used decrypt data stored on a device. This enables data to be securely stored since the key is supplied by the user at runtime and is not itself stored on the device. The serialization process is preferably based on vectors of each line rather than on any underlying grid.

BRIEF DESCRIPTION OF THE DRAWINGS

There now follows, by way of example only, a detailed description of embodiments of the present invention, with references to the figures identified below.

DETAILED DESCRIPTION OF EMBODIMENTS OF THE INVENTION

System

Figure 1:
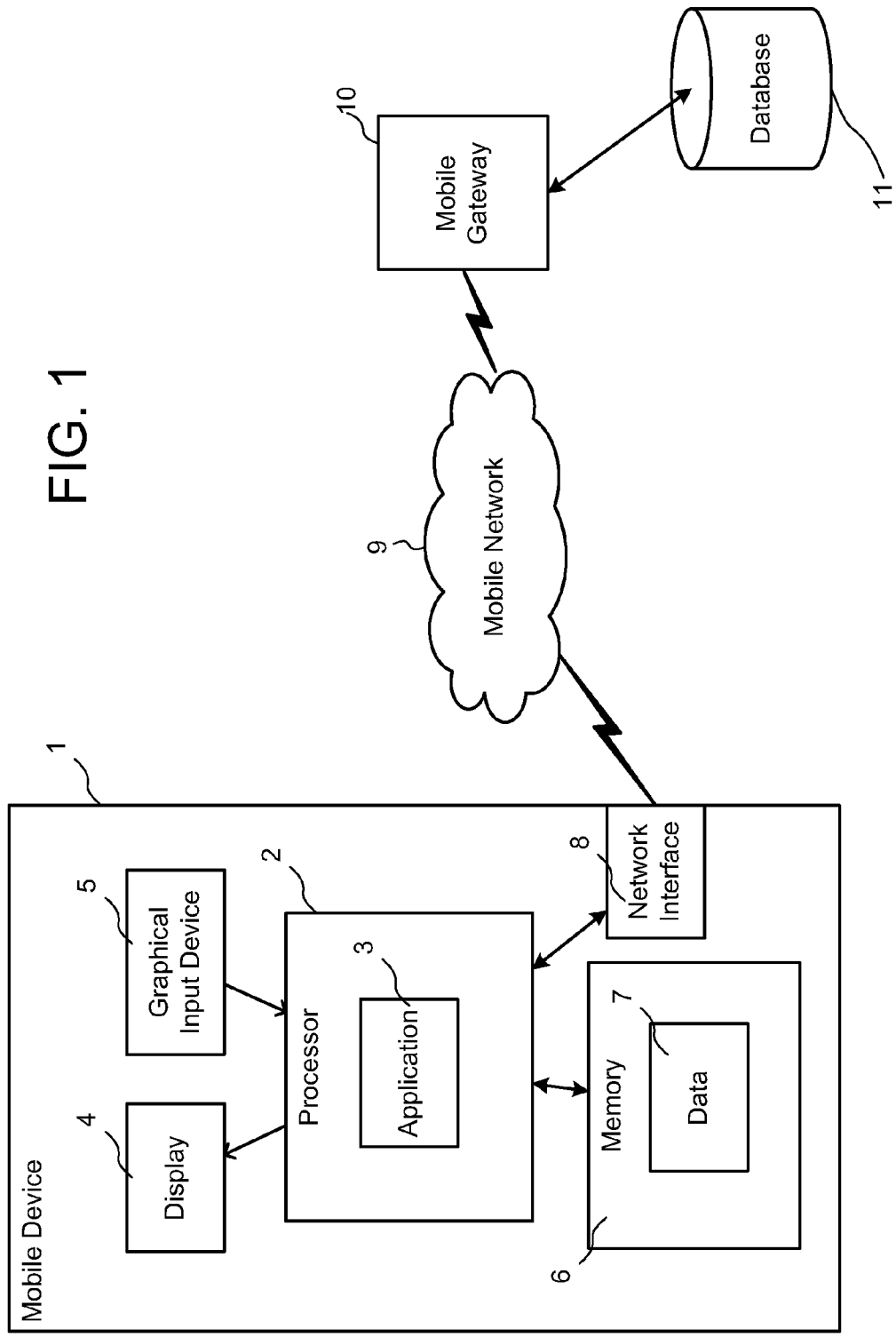
FIG. 1 is a schematic diagram of a mobile device connected to a mobile data system in an embodiment of the invention.

Referring to FIG. 1, a mobile device 1 in an embodiment of the invention comprises at least a processor 2, including for example hardware and an application platform, running at least one application 3, and connected to memory 6 storing data 7, such as account data. The application platform may be a mobile operating system such as iOS™, Android™ or Blackberry™ OS. The application 3 may comprise program code, which can be loaded or downloaded onto the mobile device 1.

The mobile device 1 has a display 4 and a graphical input device 5, which may be separate components, or integrated as a touchscreen, for example. An alternative or additional graphical input device may be used, such as a trackball, trackpad, motion sensor or mouse.

The mobile device 1 may communicate over a mobile network 9 via a network interface 8 to a mobile gateway 10, which provides access to a remote database 11, for example for retrieval of data for local encrypted storage in the memory 6. The mobile network 9 may be a cellular network supporting a wireless data connection protocol such as GPRS, EDGE or 3G.

Overview

The application 3 encrypts and decrypts data 7 using at least one key, which is generated as described below.

At an initial registration stage, the user is prompted to enter a graphical pattern which is used to generate the key. The user may be required to enter the same graphical pattern a plurality of times, such as 3 times, and the key may be generated using an approximation of the graphical pattern derived from the plurality of input patterns. Data is then retrieved from the remote database 11, encrypted using the key and stored locally as data 7. The data 7 may comprise sensitive user data which the application 3 decrypts and presents to the user on the display 4.

For subsequent access to the application 3 and/or the data, the user is required to enter a similar graphical pattern to that generated at the registration stage. A key is generated from the entered graphical pattern and used to attempt to decrypt the data 7. A slight mismatch between the original and newly entered key may nevertheless enable the data to be decrypted. In this way, the originally entered key need not be stored on the mobile device, and cannot therefore be accessed so as to compromise the security of the data 7.

The application 3 is enabled to access the data 7 even when the mobile device 1 is not connected to the mobile gateway 10. Hence, server-side lockout cannot be implemented. Instead, as described below, the user authentication is made sufficiently strong to be resistant to 'brute force' attack. However, the application 3 may implement local lock-out, for example by closing or pausing after a predetermined number of unsuccessful user authentication attempts.

Preferably, the key generation method may have sufficient entropy to resist a brute force attack, for example approaching that of 128-bit AES. However, the entered graphical pattern should reliably generate the same key when entered by the user, for example with >80% success rate.

Key Generation

Figure 2:
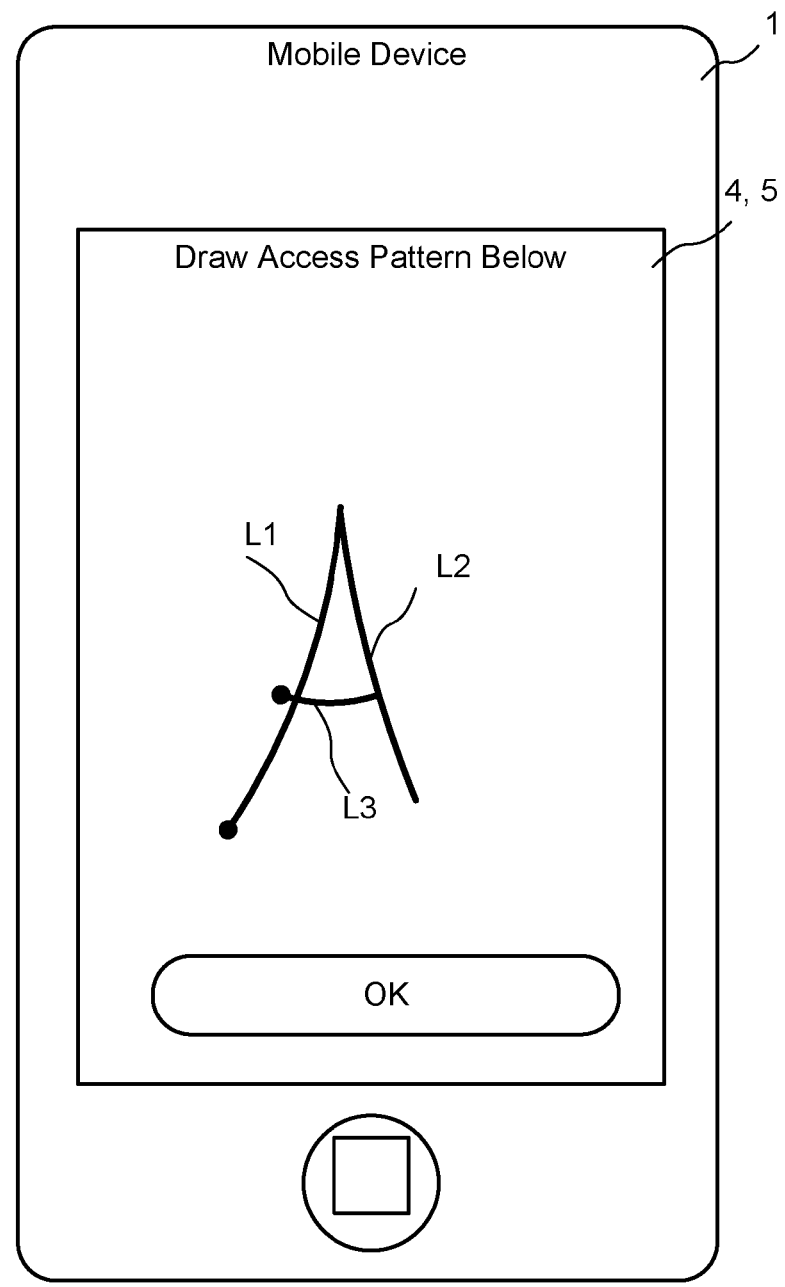
FIG. 2 shows an authentication input screen on the mobile device.
Figure 3:
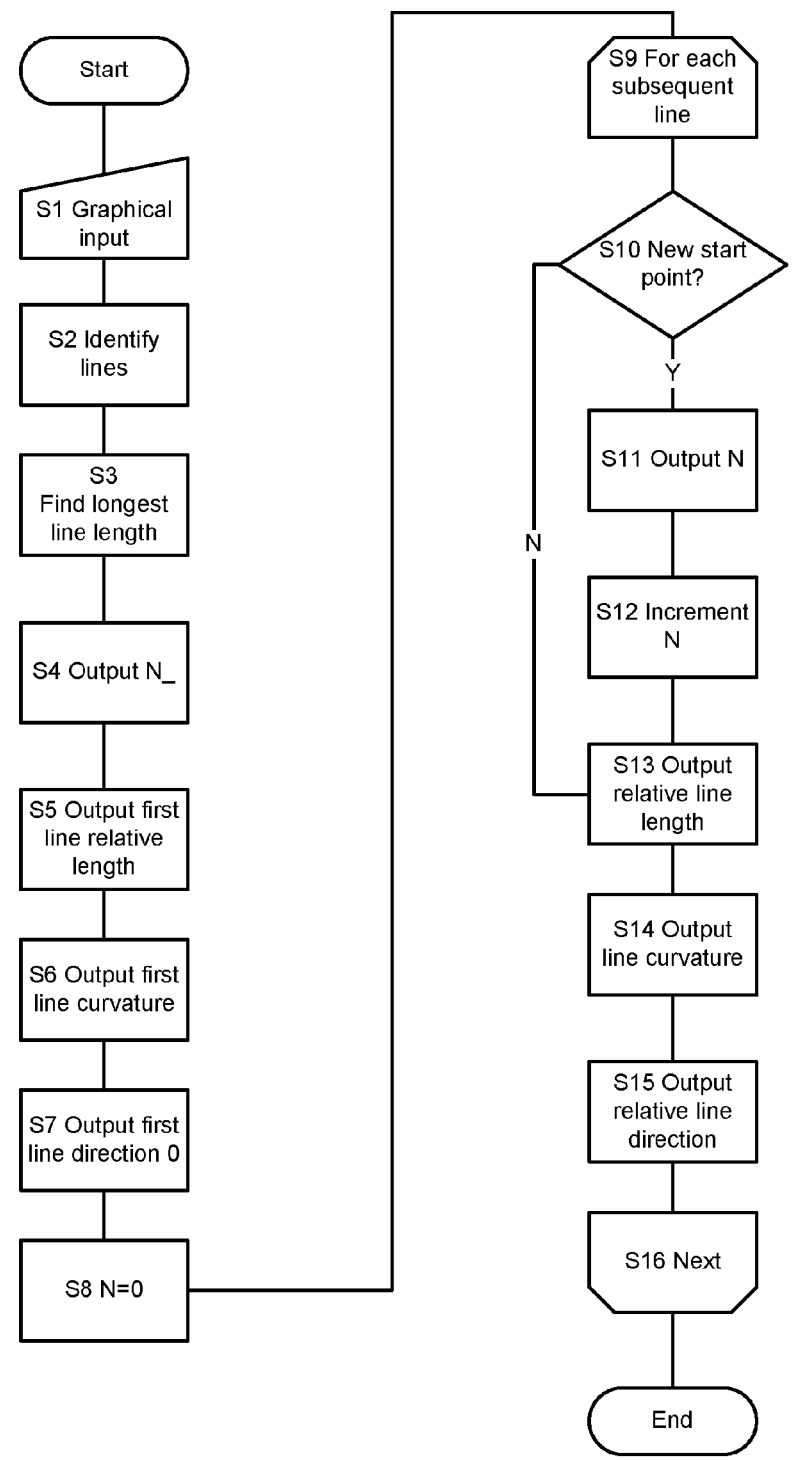
FIG. 3 is a flowchart of a key generation process in the embodiment.

One preferred method of key generation will now be described, with reference to FIGS. 2 and 3. FIG. 2 shows a user authentication screen generated by the application 3 on the mobile device, which in this case has a touchscreen forming the display 4 and graphical input device 5. FIG. 3 is a flowchart of the key generation process, as performed for example by the application 3.

When prompted, the user draws a graphical pattern comprising a sequence of lines, in this case three lines referenced L1, L2 and L3, and selects 'OK' to enter the graphical pattern (step S1). The entered graphical pattern is divided into a sequence of lines (step S2), for example by identifying breaks or discontinuous changes direction between lines.

Each line is then classified using the following vector-based parameters:

Direction—defined as an angle relative to the direction of the first line. The 360 degrees of angle are split into 9 equal divisions, with the direction of the first line assigned direction 0 (see step S7) and the directions of subsequent lines defined relative to this. Since lines may be curved, the direction of a line may be taken from its start and end points. Alternatively, a mean or approximate overall direction of the line may be taken.

Length—the longest line in the pattern is identified (step S3) and the length of every other line is classified according to its fraction of the longest length, as Short (<0.33), Medium (<0.66) or Long (>0.66). The length of each line may be taken as the distance between its start and end points, or the actual length along the line.

Curvature—the number of different directions that the line passes through is recorded and used as a measure of curvature of the line. A line that passes through only 1 or 2 directions is classified as straight, a line passing through up to 5 directions is considered 'bent' and a line passing through more than 5 directions is considered 'circular'.

Starting point—If the line continues from a previous line then there is no starting point; if the line has a new starting point (step S10), then the direction from the previous starting point is output (step S11).

For each recorded line, each classifier is applied and a key is derived from the resultant string of parameter values (step S17). For example, for the pattern shown in FIG. 2, the derived string is:

N_L)0L|4N0S|2

Where 'N' followed by an integer is a new start point followed by its direction from the previous start point. Since the first line L1 has no predecessor, then the direction is blank ('_') in this case. The line itself is then 'L' for long, ')' for bent and 0 for the direction, which is always 0 for the first line.

The next line L2 has L for long, '|' for straight in direction 4 and has no starting point as it continues from the previous line L1. The last line L3 has a new starting point that is direction 0 from the previous starting point; the starting points are indicated as circles in FIG. 2. The line L3 is short, straight and in direction 2.

As can be seen, each line after the first has:
10 starting points (no starting point or a starting point in one of nine directions from the previous starting point),
3 possible lengths,
3 possible curvatures, and
9 possible directions.
This gives a total of 10×3×3×9=810 combinations per line. The first line has only 9 combinations since the starting point and direction are fixed. Hence, the simple 3 line example in FIG. 2 has 9×810×810 or around 6 million combinations, which is 60 times stronger than a 5 digit pin and is quicker to enter. A 6 line pattern gives 30 times more entropy than a 56 bit DES key and stronger than an 18 digit PIN number, so a long pattern is extremely secure.

Security is of limited use if users are unable reliably to repeat the pattern. This becomes more of a problem as the pattern gets longer, because there is more scope for lines to be classified differently. There may also be 'quantization error' where borderline cases are classified into the adjacent discrete value.

Using the first line direction as a reference direction for all the other lines helps to improve repeatability, as the pattern does not need to be aligned with any reference direction, but quantisation error can still occur. Similarly, since hard thresholds are used to classify length and curvature, these too can be quantized to the wrong value.

Registration

Figure 4:
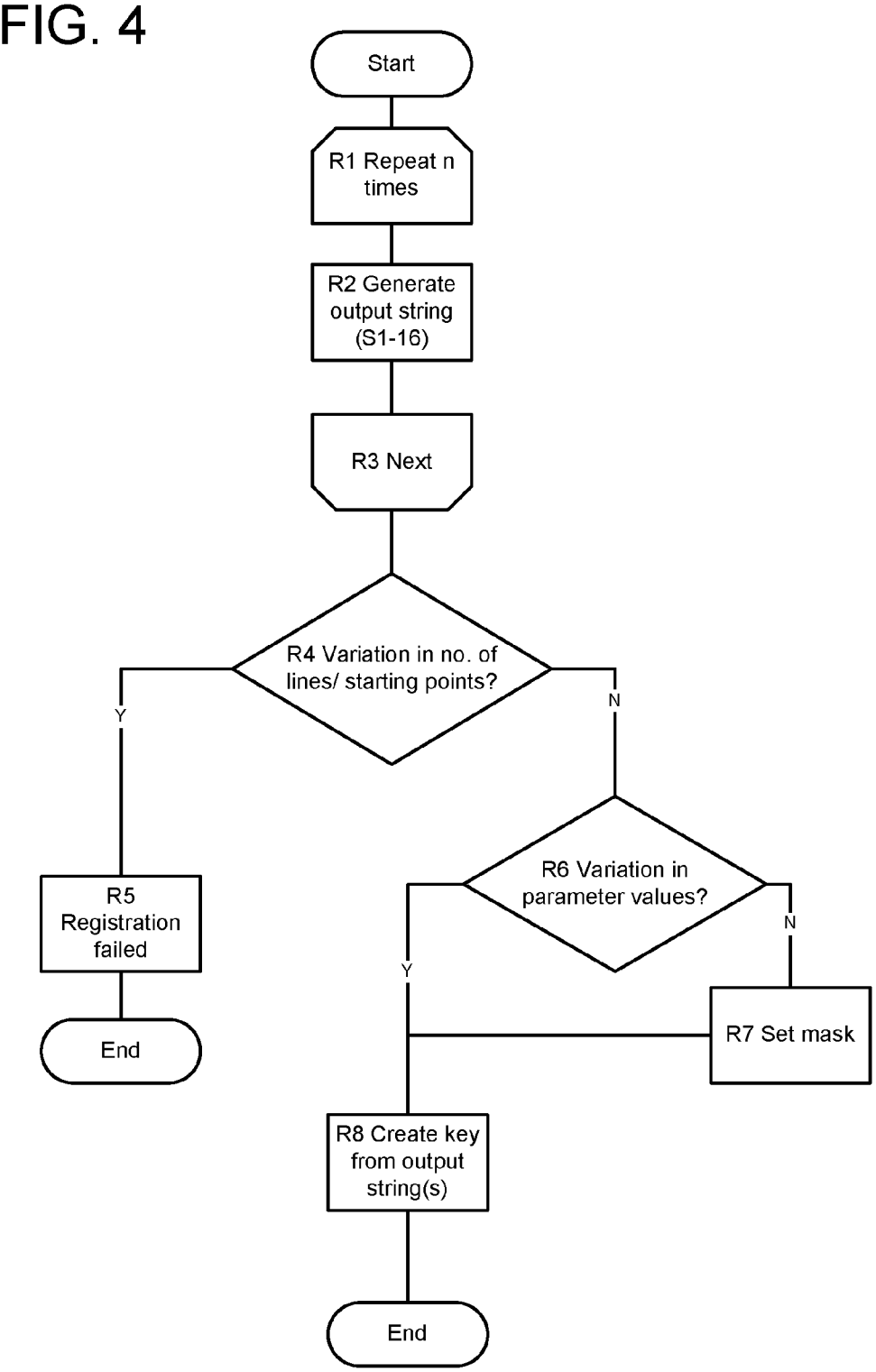
FIG. 4 is a flowchart of a key registration process in the embodiment.

To use a key for authentication and encryption/decryption, the key must first be registered with the application. One method of key registration, as performed for example by the application 3, will now be described with reference to the flowchart of FIG. 4.

To reduce quantisation and other errors to an acceptable number, the user is requested to enter their proposed pattern a plurality of times (steps R1-R3), such as 4 times, during registration. The patterns are compared and there are detected:

Variations in the number of lines or starting points (step R4); in either case, the pattern cannot be used and registration fails (step R5); and Variations in parameter values due to quantization errors (step R6), which are common on longer patterns and are dealt with by creating a key mask (step R7) that identifies areas of known errors.

The mask can then be used to generate a range of potential keys by using adjacent quanta values where the mask falls. For example, in the registration of the pattern shown in FIG. 2, two similar keys are generated:

N_L)0L|4N0S|2 Key 1

N_L)0L|5N0M|2 Key 2

The two keys are of the same length and therefore acceptable under step S4, but on the 2nd line the direction has been quantized differently in each case and on the last line the same has happened with the length. To allow for this variation, a mask is generated that indicates that these two positions suffer from errors and therefore a range of keys should be generated using adjacent values in these positions, e.g.:

N_L)0L|4N0S|2

N_L)0L|4N0M|2

N_L)0L|5N0S|2

N_L)0L|5N0M|2

Therefore, 4 different keys must be tried to ensure that all valid combinations are accepted. To enable this, a mask is generated and stored locally, for example in the memory 6, to indicate the positions in which adjacent values need to be tried. For example, the mask may be represented as '_____._____._____' where the dots indicate that adjacent values to those entered need to be tried by the application 3 when attempting to decrypt the data 7.

There is a practical limit to the number of keys that can be speculatively tried, as the load on the processor 2 and therefore the delay experienced by the user could become unacceptable if there are more than a few hundred potential keys. Also, the entropy should not be weakened excessively by generating too many keys. In the example mentioned above, 6 million possible keys have been reduced by 4 which is insignificant and yet makes the solution very practical for the user. However, if there is too much variation the parameters between the patterns entered during registration, registration may fail. For example, there may be a threshold number or fraction of permitted 'weak' positions (e.g. dots in the mask), and registration may fail if this threshold is exceeded.

In an alternative approach where it is undesirable to try a range of keys, the classifier may be degraded to fewer values at a position where variation is detected during registration. For example, if a particular length is likely to be erroneously classified as S, or M, then an alternative (e.g. coarser) classifier can be used at that position having only two possible values, S or L. The same approach may be used for the other parameter values. The mask may indicate the positions at which the alternative classifier should be used.

The key strings derived above are then hashed using a secure hash function e.g. SHA1 and then this value is used as an AES-128 key (step R8). The key may then be used to encrypt and/or decrypt the data 7 stored in the memory 6.

Authentication

Figure 5:
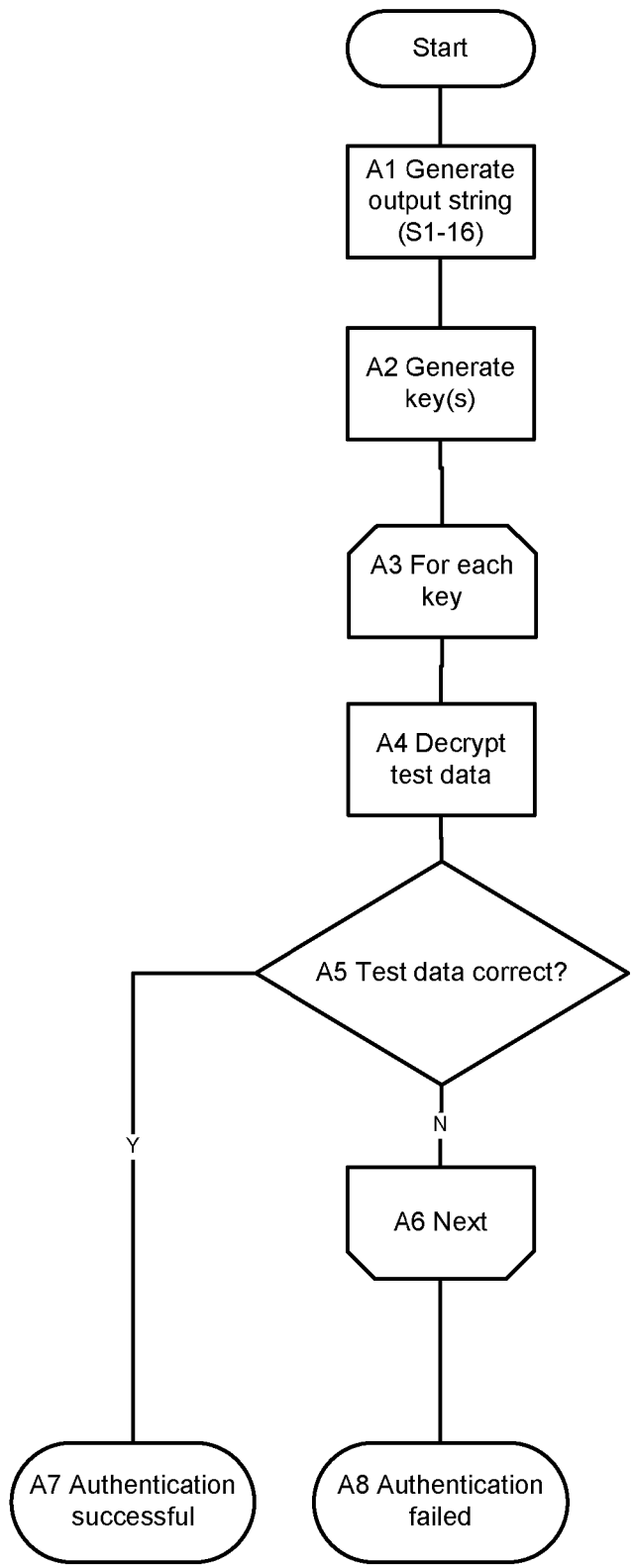
FIG. 5 is a flowchart of an authentication process in the embodiment.

An authentication process, as performed for example by the application 3, will now be described with reference to FIG. 5. The user enters the graphical pattern, from which an output string is generated (step A1, corresponding to steps S1-16). One or more keys may be derived from the output string (step A2), using the same key generation as was used during key registration (see step R8), and applying any stored mask (see step R7); hence, the result may be a plurality of keys.

To determine if the entered pattern is correct, the or each derived key may be used to decrypt a packet of data containing an encrypted known value, stored in the memory 6 (step A4). If the known value is found after decryption (step A5) then the key is known to be correct and authentication is successful (step A7); access may be granted to the mobile application, and the derived key may be used to for encryption/decryption of data 7. If the known value is not found with the or any of the keys, then authentication is unsuccessful (step A8); access to the mobile application may be denied, and no available derived key is able to decrypt the data 7.

As an alternative to decrypting a known value, the data 7 may include error detection or correction bits, and the or each derived key may be used to decrypt the data 7, not including a known value. If errors are detected in the decrypted data 7, then authentication may be unsuccessful (step A8).

Computer Programs

The application 3 may be implemented as a computer program that may be stored on or embodied in a computer program medium or computer usable medium. The media may comprise removable storage media, such as a disc or non-volatile memory, or signals such as electrical, optical or electromagnetic signals. The application may be downloaded onto the mobile device over a network, such as the mobile network 9, or via a direction connection. The application 3 may be a discrete application or may be embodied as an operating system or platform function.

Alternative embodiments may be implemented as control logic in hardware, firmware, or software or any combination thereof. Functions of the application, as described above, may be embodied as discrete software modules.

ALTERNATIVE EMBODIMENTS

The above embodiments are described by way of example, and alternative embodiments which may become apparent to the skilled person on reading the above description may nevertheless fall within the scope of the claims.

The invention claimed is:

1. A method of generating a cryptographic key for encryption and/or decryption of data stored locally on a device comprising a hardware processor and a screen that accepts graphical input, the method comprising the steps of:
   receiving a graphical pattern from a user as input to the device;
   dividing the graphical pattern into a sequence of lines, each of the lines having a direction representing the direction of the corresponding line in the graphical pattern;
   deriving values for a plurality of predetermined parameters of the sequence of lines; and
   generating the cryptographic key from the derived values;
   wherein the plurality of predetermined parameters include the length and curvature of the lines in the sequence of lines, and the directions, defined relative to the direction of one of the lines in the sequence of lines, of a respective plurality of other lines in the sequence of lines, and
   wherein the directions of the respective plurality of other ones of lines in the sequence of lines are determined relative to a first one of the lines in the sequence of lines.

2. The method of claim 1, including encrypting and/or decrypting the data using the generated cryptographic key.

3. The method of claim 2, including decrypting the data using the cryptographic key, and authenticating the user if the data is successfully decrypted.

4. A method of authenticating a user on a mobile device comprising
   a hardware processor and a screen that accepts graphical input, the method comprising the steps of:
   receiving a graphical pattern from a user as input to the device;
   dividing the graphical pattern into a sequence of lines, each of the lines having a direction representing the direction of the corresponding line in the graphical pattern;
   deriving values for a plurality of predetermined parameters of the sequence of lines; and
   authenticating the user by the derived values;
   wherein the plurality of predetermined parameters include the length and curvature of the lines in the sequence of lines, and the directions, defined relative to the direction of one of the lines in the sequence of lines, of a respective plurality of other lines in the sequence of lines, and wherein the directions of the respective plurality of other ones of lines in the sequence of lines are determined relative to a first one of the lines in the sequence of lines.

5. The method of claim 4, wherein the derived values are quantised to a small number of discrete values.

6. The method of claim 4, wherein the plurality of predetermined parameters include a relative starting point of one or more of the lines.

7. The method of claim 4, including detecting variations of the derived values between a plurality of the received graphical patterns, and storing locally on the device a record of the variations, wherein the record is used to allow variations in a subsequently received graphical pattern falling within the detected variations.

8. The method of claim 7, wherein the record includes a mask indicating variations for selected derived values.

9. The method of claim 7, including expanding the quantisation size for selected derived values in which variations were detected.

10. A mobile device comprising:
memory storing data,
a processor running an application, and
a graphical input device,
    wherein the graphical input device is arranged to receive a graphical pattern from a user and to divide the graphical pattern into a sequence of lines, each of the lines having a direction representing the direction of the corresponding line in the graphical pattern, and an application is arranged to derive values for a plurality of predetermined parameters of the lines in the sequence of lines, and to generate a cryptographic key from the derived values, wherein the cryptographic key is operable to decrypt and/or encrypt the data, and wherein the plurality of predetermined parameters include the length and curvature of the lines in the sequence of lines, and the directions, defined relative to the direction of one of the lines in the sequence of lines, of a respective plurality of other lines in the sequence of lines, and
wherein the directions of the respective plurality of other ones of lines in the sequence of lines are determined relative to a first one of the lines in the sequence of lines.

11. A mobile device comprising;
memory storing data,
a processor running an application, and
    a graphical input device, wherein the graphical input device is arranged to receive a graphical pattern from a user and to divide the graphical pattern into a sequence of lines, each of the lines having a direction representing the direction of the corresponding line in the graphical pattern, and an application is arranged to derive values for a plurality of predetermined parameters of the lines in the sequence of lines, and to authenticate the user by the derived values; and wherein the predetermined parameters include the length and curvature of the lines in the sequence of lines, and the directions, defined relative to the direction of one of the lines in the sequence of lines, of a respective plurality of other lines in the sequence of lines, and
wherein the directions of the respective plurality of other ones of lines in the sequence of lines are determined relative to a first one of the lines in the sequence of lines.

* * * * *